March 2, 1948.   R. B. LARTER   2,437,102
INDEX DEVICE
Filed Dec. 29, 1945
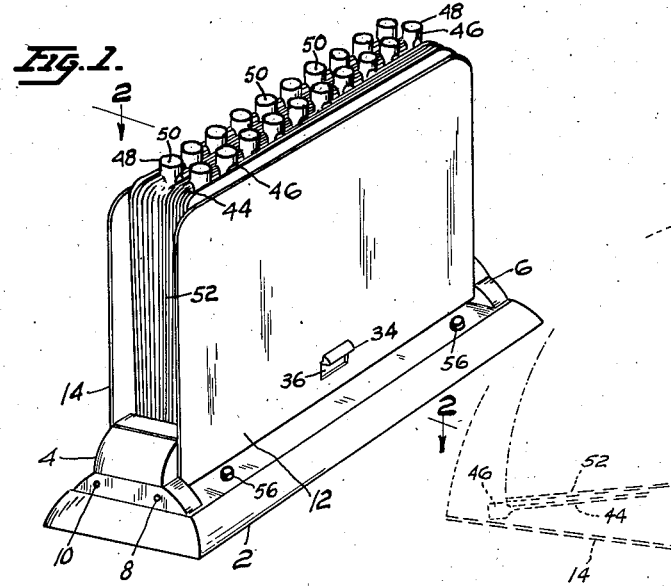
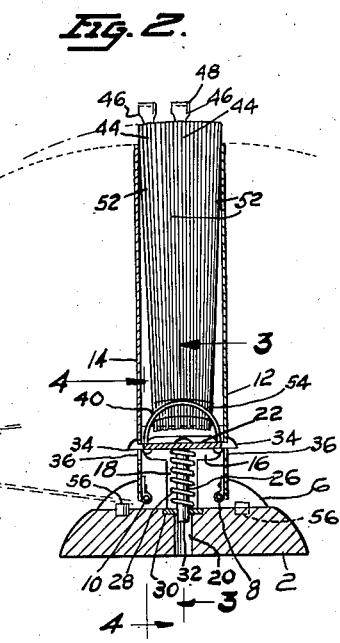
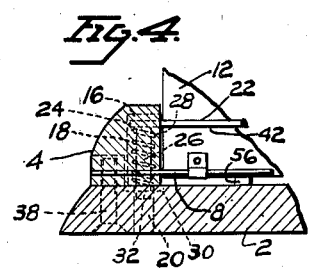
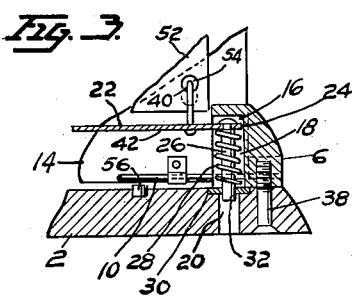
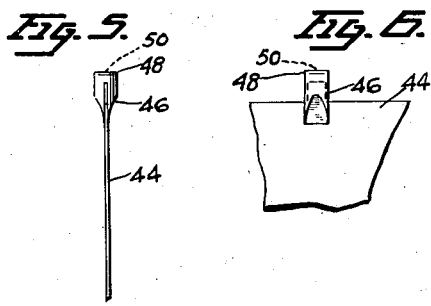
INVENTOR
Raymond B Larter Patented Mar. 2, 1948

2,437,102

UNITED STATES PATENT OFFICE 2,437,102

INDEX DEVICE

Raymond B. Larter, Los Angeles, Calif., assignor of one-half to Leonard J. Hull, Los Angeles, Calif.

Application December 29, 1945, Serial No. 638,021

7 Claims. (Cl. 129—15)

My invention relates to index devices and more particularly to such indexing apparatus which will open sidewardly in form of a note book and thereby facilitating its use.

Manifestly an object of my invention is to provide an index device having a plurality of index cards and index note cards disposed therein, and also having means for actuating the opening of said index device for exposing the interior section thereof.

Another object of my invention is to provide said index device with suitable means adapted for facilitating the replacement of said index note cards therein.

A further object of my invention is to provide said index device with positive locking means adapted for holding said index cards, including said index note cards, in locked position.

My invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combination and arrangements of parts, which will more fully appear in the course of the following description.

In the drawings:

Fig. 1 shows a perspective view of the indexing device.

Fig. 2 shows a vertical sectional view thereof, taken in the direction of the lines 2—2 of the Fig. 1.

Fig. 3 is a fragmentary sectional view of the base end section, taken on the line 3—3 of Fig. 2.

Fig. 4 is another fragmentary sectional view of the base end section, taken on the line 4—4 of Fig. 2.

Fig. 5 shows the end elevational view of the index card, showing the indexing button in position.

Fig. 6 shows a fragmentary and side view of the index card, showing the construction of said indexing button member.

Describing my invention more in detail, said invention comprises a base 2, having a pair of end upright members 4 and 6, each of which is provided with hinge pins 8 and 10, upon which a suitable side cover members 12 and 14, respectively, are mounted.

In each of said upright members 4 and 6, a suitable cavity 16 is provided, each having a side passage 18 which is disposed directly over a hole or passage 20 within said base 2.

In between said upright members 4 and 6 a suitable cross plate 22 is provided, of which, each end 24 is disposed within said cavity 16, said plate also having a suitable pin member 26 extending downwardly and disposed at each end thereof, as shown in Fig. 3, which is adapted for holding a suitable compression spring 28 in place, the lower end of which rests upon a washer 30, and which is for the purpose of holding the pin end 32 in position and for guiding it into the center of said hole 20.

In the center section of said plate 22 a suitable lock extension 34 is provided, which extends outwardly therefrom and one at each side, each of which protrudes through a suitable passage 36, which is disposed in each of said cover members 12 and 14, as shown in Figs. 1 and 2, the purpose of which will be presently described.

Said upright members 4 and 6 are held in place and position by means of screws 38, and thereby holding said hinged covers 12 and 14 in their respective positions.

The upper surface section of said cross plate 22 is provided with a pair of mounting rings 40, each having their extended ends riveted at the bottom section 42 of said plate and thereby holding said rings rigidly in place.

Said rings 40 are provided with and are holding a plurality of index designation cards 44, each of which is provided with a selector button member 46, the outer surface section of which, as at 48 is provided with a selector index number or letter 50.

It may be noted, that said selector buttons 46 are so arranged whereby one will not interfere with the other and when the said index cards are in their vertical position a minimum space is provided between said covers 12 and 14, as shown in Figs. 1 and 2.

Between said index cards 44 a plurality of index sheets 52 are mounted, each having a conventional slotted hole 54 for holding same in position and upon said rings 40.

When in use, each of said cards 44 is made out of rigid cardboard, while the index sheets 52 are made of thin paper, thus allowing said cards to be held in a vertical position between said covers 12 and 14.

Said lock extension 34 holds said cards and said covers in position as shown in Fig. 1.

In operation, when it is desired to select any particular index sheet, then the selector button member 46 is pressed downwardly, thereby depressing all selected index cards 44 and causing said rings 40 including said cross plate 22 to become depressed, which action causes said lock extensions to become disengaged from their respective passages 36, which allows said covers 12 and 14 to swing outwardly and into a horizontal position, as shown in dotted lines in Fig. 2.

When the index device is opened in this manner by means of said selector button 46, then the particular index sheets 52 corresponding to and indicated by said button is in readiness for use.

Also, it may readily be noted that any of said index cards may be used and selected or exchanged for new, while said covers 12 and 14 are in their horizontal position.

For preventing an undue strain which may be imposed upon said hinges 8 and 10, suitable resilient buttons 56 are provided, which are disposed upon the outer surface of said base 2 of said index device, as shown.

While I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein, which may come within the scope of the appended claims.

I claim:

1. In an indexing device of the class described comprising a base, an upright member at each end of said base, a pair of hinged covers mounted between said uprights and providing a space therebetween, a plate mounted between said covers in close proximity to and above said base, means for holding said plate in an uppermost position, a pair of ring members mounted at each end of said plate for holding a plurality of index cards and index sheets thereon, and lock means extending sidewardly from said plate for engaging said covers and for holding said index cards and index sheets in a vertical position between said covers.

2. In an indexing device of the class described comprising a longitudinal base, a pair of upright members each mounted upon the respective end of said base, a pair of hinged covers mounted between said pair of uprights and providing a space therebetween, a longitudinal plate mounted between said uprights and within said space between said covers, a lock means at each side of said plate for engaging a passage in said covers, a spring at each end of said plate for holding said covers in locked position by urging said lock means into place, a pair of rings mounted upon said longitudinal plate for mounting index cards and index sheets thereon, and selector means on each of said index cards for selectively actuating the disengagement of said lock means and thereby causing said covers to open.

3. In an index device of the class described as disclosed in claim 2, wherein, resilient buttons are provided upon said base for relieving the strain imposed upon said covers when same are swung open.

4. In an indexing device of the class described as disclosed in claim 2, wherein, a cavity is provided in each of said uprights for holding the ends of said longitudinal plate in position.

5. In an indexing device of the class described, as disclosed in claim 2, wherein, a pin is provided at each end of said longitudinal plate for holding said spring in a mounted position and thereby urging said plate into its uppermost position.

6. In an indexing device of the class described, as disclosed in claim 2, wherein, a hole is provided in said base and directly below the pin adapted for holding said spring in place, for providing a clearance for said pin when said plate is depressed into its lowermost position.

7. In an indexing device of the class described as disclosed in claim 2, wherein, a washer is provided over said hole in said base for guiding said pin and for holding said pin in position when said plate is depressed into its lowermost position.

RAYMOND B. LARTER.

REFERENCES CITED

The following references are of record in the file of this patent:

UNITED STATES PATENTS

| Number | Name | Date |
| --- | --- | --- |
| 533,053 | Cooke | Jan. 29, 1895 |
| 2,180,892 | Adams | Nov. 21, 1939 |
| 2,186,436 | Shaler | Jan. 9, 1940 |
| 2,334,800 | Vernon | Nov. 23, 1943 |